Jan. 16, 1968   B. F. SKINNER ET AL   3,363,338

METHOD AND DEVICES FOR TEACHING WRITING SKILLS

Filed Dec. 10, 1965

INVENTOR
B. F. SKINNER
J. R. EHRLICH

BY *Larson and Taylor*

ATTORNEYS

United States Patent Office 3,363,338
Patented Jan. 16, 1968

3,363,338
METHOD AND DEVICES FOR TEACHING
WRITING SKILLS
Burrhus F. Skinner, Cambridge, Mass., and Joseph R. Ehrlich, New York, N.Y., assignors to Meredith Publishing Company, Des Moines, Iowa, a corporation of Iowa
Filed Dec. 10, 1965, Ser. No. 512,883
15 Claims. (Cl. 35—36)

This invention relates to a method of teaching writing skills and to a device used in connection with the teachings of writing skills. More particularly, the invention relates to a method and device for teaching handwriting skills. Still more particularly, the invention relates to a method and device for teaching the hand rendering of the written word by script or printing.

Teaching of handwriting and writing skills traditionally occupies a great deal of the time of primary, preprimary and grade school teachers. The methods vary but usually involve the teacher's presentation of the desired form of a symbol, letter, and the like, the student's attempt at faithfully copying or reproducing the symbol, the teacher's correction of that attempt, the student's observation of his errors and their correction, and a repetition of the process until the student is able to reproduce the symbol correctly from memory. "Correctly," of course, means that the student's representation is sufficiently precise as to be meaningful to another person who has knowledge of the correct form of the symbol which is to be communicated.

The present invention is directed to improving the usual method of teaching writing skills and it is an object hereof to shorten the time required to complete instruction. The usual goal is to teach handwriting or the representation of the written word either by printing or script, but the fundamental skill taught involves the discernment and reproduction of geometrical configurations broadly. That is, before an illiterate can be taught how to write the letter "A," he must be able to discern differing geometrical shapes one from the other as, for example a circle and an oval. In the context of this invention, therefore, the expression "writing skills" includes skills underlying the ability to write such as the ability to discern form and size and the ability to draw. Thus, it is an object of the invention to teach manual writing skills in a general sense and it is a further object to so instruct in a rapid and efficient manner and to provide devices utilizable for such rapid and efficient instruction.

In analyzing teaching methods, it has been observed that considerable time is necessary to evaluate the student's performance. For example, a student attempting to correctly write the letter "A" either from memory or from an original which can be copied, must be supervised while he is rendering the letter or his finished attempt must be corrected by the teacher. In the first instance, only one student may be supervised at a time whereas in the second instance the student has no idea whether he has performed correctly until long subsequent to his action. While waiting for correction, of course, the student is free to (and will undoubtedly) continue making the same errors as have been made previously and this time is wasted and may even lead to bad habits. In order to remedy this situation, the present invention serves to provide the student with a continual and substantially instantaneous report of this activity. This report may consist in a substantially instantaneous visually detectable indication of the correctness of the position of a writing implement with respect to a surface upon which the student is attempting to represent a geometrical symbol, in a substantially instantaneous indication of the correctness of a choice of geometrical configurations, or a substantially instantaneous report indicating the correctness of a written word or symbol or in other ways as will become apparent. In each of the foregoing instances, a prime object is to substantially reduce the need for teacher supervision and also to provide a very efficient teaching method. This is accomplished by providing the student with a direct and substantially instantaneous report of the correctness of his writing activity, whatever that activity may be. It is to be noted that the said writing activity is not confined to any specific type such as copying. Thus, methods and devices according to the invention may be utilized to teach not only by copying or matching exercises, but may be also used to teach writing skills directly.

A correct representation of a two dimensional image is rendered by providing image areas contrasting with background. The "correctness" of the representation varies, of course, with the skill of the person attempting to reproduce the original. For purposes of handwriting, however, correctness depends upon whether one already skilled can understand the student's attempted representation. That is, a student's handwriting is correct when the reader understands the symbol, letter or word which the writer attempts to communicate. Thus, "correctness" has a special meaning. The letter "A," for example may be written large or small and nevertheless be correct. Also, a letter of given height may vary in width or in several other respects and yet be "correct" in form. Thus, correctness has a certain amount of tolerance and some deviations are natural and acceptable.

On correcting a writing lesson, the teacher, in effect, discerns any deviation from an acceptable representation of an original and informs the student of that deviation. According to the present invention, the same deviation may be instantaneously detected by the student during the act of writing so that correction time is minimized. This is accomplished by providing "correct" and "incorrect" areas on a sheet or other work surface. The student may then be instructed to render a given form. When the student writes in the "correct" areas, a visual effect, such as a color effect, is produced. These visual effects are at least substantially instantaneous with contact between the writing instrument and the sheet and thus provide the student with an instantaneous report on his writing activity. He then proceeds in light of that past report. Although not necessarily in the same form, this report corresponds to the report of a teacher who has laboriously corrected the accuracy of the student's writing. The same result can be obtained, however, in other writing activities which do not involve rendering a given form. For example, a student may be instructed to write on a line but to keep the upper limits of upper case letters at a certain distance above the line. A sheet is then provided with a line and an area above the line, which, when contacted with the writing instrument, causes a certain visual effect different than that caused by writing on other portions of the sheet. "Correctness" is indicated by the association of the visual effect with the top portions of upper case letters.

In another embodiment of the invention the same principle may be relied upon in a "matching" operation. In this method, the student is provided with an original image and several additional images, one only of which matches or is otherwise logically related to the first. The matching or related image has a "correct" area associated therewith and a mark in that area forms a correct color whereas a mark in any other area leaves an incorrect color.

In all of the systems according to the invention, it is important that the difference between correct and incorrect areas on the work sheet is not discernible. Thus, where a correct area is provided on a sheet, that area should not be visible to the student. The only way that the correct area can be detected is by contact between the correct area and the writing instrument. It is to be understood that the expressions "invisible," "indiscernible" and the like in this context relate to discernment by the student without the use of special equipment, etc. In other words, a student with normal eyesight, under normal lighting conditions cannot visually detect correct and incorrect areas on the work sheet prior to his attempt to write. It is to be understood that in order to teach a student the present technique, the correct areas may be intentionally rendered visible to teach the present method to the beginning student. However, it is not an object of the present invention to teach ability to trace and the method of teaching according to the invention therefore requires that the different areas of the original at least be substantially indiscernible. In the event that the difference between correct and incorrect areas is slightly discernible, this may be remedied by varying lighting conditions, such as with colored filters. Alternatively, correct and incorrect areas which would be otherwise discernible may be rendered invisible by utilizing a sheet having a mottled surface.

It is additionally desirable that there be a sharp definition between correct and incorrect areas. Therefore, the application of any ink or writing fluid by the writing instrument should result in little, if any, "carry over" of materials from one area to another which would reduce definition between correct and incorrect areas.

Further, the materials should be non-toxic where the students are children, the visual effects or colors should be sharply contrasting, and the reproduction of each visual effect should be very rapid and preferably instantaneously upon contact between the work surface and the writing instrument.

The "correct" and "incorrect" areas referred to above may be provided in any of several ways to be described more fully hereinafter. The differing visual effects may be effected by any of several systems according to the invention such as a marking system or a color system. In a marking system, a writing instrument causes a mark to be made in one area (either correct or incorrect, but preferably correct) and no mark to be made in the other area (correspondingly, either incorrect or correct and preferably incorrect). In one type of color system, hereinafter referred to as a "two-color" system, the writing instrument makes its own natural color in untreated areas and makes a different color in treated areas of the work sheet. In another color system, hereinafter referred to as a "three-color" system, the writing instrument causes two different colors to be produced in the correct and incorrect areas on the work sheet and both are different from the natural color produced by the writing instrument on untreated writing paper.

In the two color system, the writing instrument causes its own color to be produced in untreated areas and a different color to be produced in treated areas. The treated area is usually the "correct" area for purposes of economy as the "correct" area on a sheet is ordinarily the lesser in extent. It is to be understood that the word "treated" is used here in a sense that treatment results in the fact that contact between a writing material and that area would cause production of a visually detectable color by means of a chemical or physical reaction between the writing material and the area. For example, the treated area may be provided by treating the whole surface of the work sheet with a first material and then treating certain areas of the sheet with a second material that negates the use of the first material in the said certain areas. In one sense, then, the said certain areas are treated twice and remaining areas once. However, the expression "treated areas," as used in the present context, applies only to the said remaining areas as it is these areas which cause production of the different colored effect. Thus, "untreated areas" include such areas as are treated twice and upon which the writing instrument produces its own color.

In the three-color system, the work surface is provided with correct and incorrect treated areas each of which is treated to cause production of a colored effect different from each other and different from the natural color caused by writing on an untreated surface. The treated areas may be provided as described above with respect to the two color system.

In the marking system, the sheet is treated to produce a colored effect in one area only and no color effect in another. The lack of color effect is included within the scope of the term visual effect as the absence of color is visually discerned. In this system, it is preferred that the correct areas are colorable by contact with a writing instrument whereas the incorrect areas are not because the absence of a colored effect would not provide the student with an appropriate reward for correct writing activity.

The writing instruments may be of the pencil or pen type or even a simple stylus depending on the particular coloring system employed. Thus, fountain pens, ball pens, felt pens, or virtually any ink writing instrument is contemplated. The "ink" used will depend upon the color system employed as will become apparent hereinafter.

The "correct" and "incorrect" areas may be provided by simply differently treating the desired areas of a paper or other sheet material by any convenient method. Thus, the areas may be either hand or machine printed with treating material or the materials may be incorporated into the body of the sheet stock in the desired configuration. These and other features of the invention, as well as further objects and advantages to be obtained by the practice thereof will become more fully apparent in view of the following detailed description thereof including the drawings in which.

Figure 1:
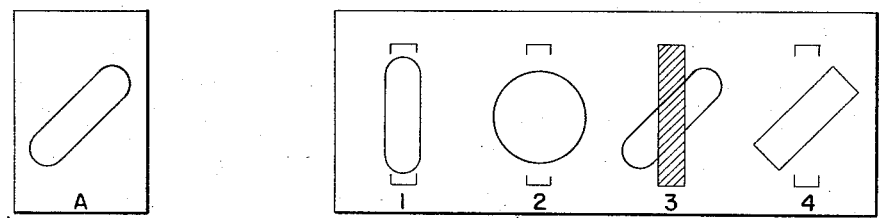
FIGURE 1 shows a sheet according to one embodiment of the invention provided with control image A and several other images 1 to 4 associated with the control image of which only number 3 is a correct reproduction of the control image. The remaining images may be of various form which may approach the configuration of the original as desired.

With reference to FIGURE 1, the invention may be carried out in one embodiment as follows. A worksheet is provided with several original images such as A and several additional images 1 to 4 associated therewith. The student has previously been taught the principles of "matching" and has been instructed to mark the matching symbol adjacent the original or control symbol. Only choice numbered 3 matches the original and the paper has been treated such that a mark made which indicates the correct choice will be different from a mark made which indicates an incorrect choice. The student is also instructed as to the place associated with each choice that the mark should be made. In FIGURE 1, the location is indicated by brackets. The student is instructed to make a line or mark between the brackets associated with the image which he believes is correct. The area between the brackets of the matching image is treated with a material such that a mark made therein is different from that which would be made by writing in either of the other brackets. This treated area is not discernible but is shown shaded in the drawing for purposes of explanation. The student is advised of the "correct" visual effect. Thus, as the student makes his choice by marking in one of the brackets, he is instantaneously either "rewarded" with the correct visual effect or "reprimanded" with the wrong visual effect and thus he receives a direct report of his writing activity. The visual effect, such as a color, is preferably permanent so that a supervisor may, at any time, detect progress and any peculiar difficulties experienced. By presenting geometrical configurations of more or less complexity and by providing choices having more or less readily discernible differences, the student learns and practices in recognition and discernment of such shapes and forms to develop writing skills.

Figure 2:
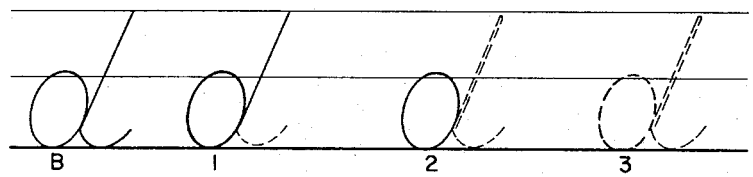
FIGURE 2 shows a sheet according to another embodiment of the invention provided with control image B and several partially completed images 1 to 3 associated with the control image.

In the embodiment of the invention shown in FIGURE 2, the control image is a written letter and adjacent each control are several partially completed reproductions of the original. The partially complete image may consist of an entirely dashed configuration, a partially completed solid line, a partially completed solid line and a dashed portion as shown, or just a starting point. The purpose of varying the extent of completeness, of course, is to vary the difficulty of the particular exercise. The remainder of the reproductions is not visible to the eye, but consists of an area on the paper which causes a visual effect upon contact with the writing instrument, and this effect is different from that obtained when other areas of the sheet are so contacted. Any incorrect reproduction is instantaneously reported to the student by a visual effect caused by movement of the writing instrument outside of the correct area.

Figure 3:
FIGURE 3 shows a sheet according to yet another embodiment wherein the control image is a diagram or picture and wherein an image associated therewith is a written word which may be incompletely visible.

In the embodiment shown in FIGURE 3, the control image is a picture of a house and the word "house" is partially visibly printed near the picture. The remainder of the word is not visible but is provided as a "correct" area according to the invention as shown in dashed lines in the drawing. Thus, the invention is not limited to exercises wherein the student should reproduce or match the original as such, but includes exercises where a correct activity is in properly writing the name of a pictured object or, vice versa, selecting the picture of an object which corresponds to a written word. The written word thus becomes a control image.

Figure 4:
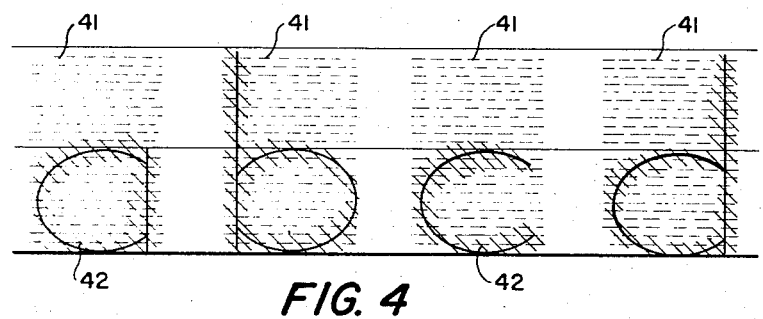
FIGURE 4 shows a sheet according to yet another embodiment wherein no control image is present.

In each of the embodiments described above, it is to be understood that the method can be performed by providing the various control images, words, etc., in other locations than on the work sheet. Thus, the control image may be provided on one page of a book opposite the work sheet. Similarly, the control image may be placed on a blackboard or even spoken. When spoken, the control image is not, of course, an image in the usual sense. However, the teaching method requires the presentation of a stimulus in the form of an "original" and the student's attempt at correctly responding to that stimulus. In one instance the student might be told to write the word "house." In another, he might be shown the word "house" and told to reproduce it. In still another, he might be shown a house and told to write the word. In all of these exercises, however, the student is provided with an instantaneous report of the correctness of his activity according to the invention.

Where the student is presented with a spoken "original," the embodiment of the invention shown in FIGURE 4 may be used. This sheet is provided with correct and incorrect areas according to the invention and is also provided with various lines and other indicia which aid in teaching writing techniques such as spacing and differentiation between height of letters or between upper and lower case letters. Each shaded area 41 defines an area for reproducing a letter of the alphabet and is suitably spaced from the next area. A heavy line is provided for the bottom of the letter and a light line may be provided as a guide for lower case or small letters such as the "a" shown in FIGURE 4. Each shaded area 41 is also provided with a treated, but not discernible, area 42 shown by cross hatching which bears the general configuration of an original to be reproduced; in this case the beginning letters of the alphabet. A student who correctly reproduces the original (which is the alphabet in this case) thus obtains reinforcement or encouragement in the form of a correct visual effect produced substantially instantaneously.

The foregoing and other embodiments according to the invention are illustrated in the examples which follow:

*Example I*

A sheet of paper was printed with black ink with pictures of oval A as shown in FIGURE 1 and with four additional pictures associated therewith. Oval A constitutes a control image while the additional pictures represent choices for the student. Of each of the four images associated with the control, only one is a duplicate thereof. The duplicate in FIGURE 1 is number 3.

The area between brackets 1, 2 and 4 on the printed sheet is then coated with a wax solution. As the student has been instructed to mark only between brackets, other areas of the sheet are not coated. The dried wax coating does not "take" a pencil mark but the uncoated area, of course, does. Similarly, the wax coating does not "take" water color applied by brush. Thus, if the student selects image number 3 as a duplicate and writes between the brackets associated therewith, the pencil or brush causes an instantaneously visible mark to be produced. If, however, the student were to mark any of images 1, 2 or 4, he would get no mark. The student would thus be rewarded or reprimanded simultaneously with his writing activity.

Waxes generally are suitable to provide coatings upon which pencils and water-based inks can mark only with difficulty. The wax may conveniently be deposited from either aqueous suspension or solution in a suitable solvent such as petroleum ether. The concentration of the wax in the solution is not critical as several coats can be applied as suitable to achieve the desired result. Accordingly, it is desirable to use a solution which can be applied by high speed printing machine, as this is an efficient way of producing large numbers of pages partially coated with the wax solution. The wax solution is thus simply printed onto the page such that the wax is coated between brackets of each incorrect image. While other portions of the page may be coated, the area between brackets of the coated area is not coated. Paraffin and other waxes may, of course, be used provided that, when coated, they remain substantially indiscernible from uncoated areas. Synthetic waxes such as the Fisher-Tropsch waxes, amino- and amido waxes etc. may also be used. Among suitable natural waxes are petroleum waxes, such as paraffin, ceresin, bleached ozokerite etc. and vegetable waxes, such as Japan wax, bleached Ouricouri, bleached beeswax, or Spermacety, or even long-chain fatty acids such as stearic acid, palmitic acid, myristic acid etc.

The wax coatings according to this example can be used in other ways according to the invention. The control image, of course, may be disassociated from the work sheet and may even be spoken. The area which is not coated may also take the form of the "correct" areas shown in FIGURES 2–4. Furthermore, the wax could be coated in the form of a star or other symbol associated with the choice images. The star could be located in a large area in which the student was instructed to indicate his choice by coloring entirely with, e.g., watercolor. This embodiment is particularly suitable because only a small area need be coated with the wax material. If the correct area were so colored, a star or other symbol would appear in the form of an uncolored area within the large area. If the incorrect area were colored, no star would appear. Thus, the wax coating "marking" system can be used in such a manner to permanently record both correct and incorrect activity.

*Example II*

A sheet is printed as shown in FIGURE 1 with control and choice images each having brackets to indicate a marking area. The area between the brackets associated with the correct image (number 3) is treated with citric acid. The student is provided with a pen or other device suitable to apply a solution of a pH indicator to the paper. The pH indicator may be any of several which change color on contact with the citric acid but Congo Red which changes from blue to red at acid pH is excellent. The pen is provided with an alcoholic solution of Congo Red weakly buffered at a pH over 5.0 or slightly above its transition range and this solution remains blue when applied to untreated paper but turns red when the citric acid is contacted. With this system the student is instantly "reprimanded" with a blue color or "rewarded" with a red color. The colors are also substantially permanent and thus provide a record of errors and progress.

A wide variety of materials are applicable to the foregoing pH indicator system. The paper may be treated with either acid or basic materials (provided of course that the treated areas remain at least substantially invisible) and the writing instrument can be provided with the appropriate color changing materials. In some cases the basicity necessary to effect a suitable change is so high that the base will eventually react with the paper and thus become visible. These materials, of course, must be used prior to becoming visible as otherwise the student would be able to simply trace the visible areas caused by reaction of the base with the paper. The acid or base is conveniently applied in aqueous solution comprising a bonding agent such as methyl cellulose, polyvinyl alcohols, sodium carboxymethyl cellulose and hydroxyethyl cellulose, or naturally occurring materials such as gelatin and starch. Many pH indicators can be used among which are the following:

| Indicator | pH Range | Color Change |
|---|---|---|
| Thymol Blue | 8.0–9.2 | Yellow-blue. |
| Cresol Red | 7.8–8.8 | Yellow-red. |
| Phenol Red | 6.4–8.2 | Do. |
| Bromthymol Blue | 6.0–7.6 | Yellow-blue. |
| Litmus | 4.5–8.3 | Red-blue. |
| Bromphenol Blue | 3.0–4.6 | Yellow-blue. |
| Congo Red | 3.0–5.0 | Blue-red. |

The indicator writing solutions are weakly buffered and the acid or base material on the sheet is strongly buffered. The following buffering solutions may be used: pH 2–5, citric acid-HCl-NaOH; pH 5–8, acetic acid-NaOH; pH 8–10, borax-HCl-NaOH.

It is also possible to treat the sheet with colorless pH indicators such as, phenophthalein, thymophthalein, or trinitrobenzene, all of which color on contact with bases, and to utilize a basic material in the writing ink. However, the pH necessary for the color change is quite high which necessitates a concentrated, and thus caustic, writing ink. Thus, the use of lower pH indicator in conjunction with acids coated on the paper is preferred. The acid should coat colorless and be sufficiently concentrated to produce an easily detected reaction with the writing fluid. Acids which chemically react with the paper, such as nitric, should be avoided. Since the indicator reactions are effected in aqueous solution, only those acids which are sufficiently water soluble are suitable and highly water soluble acids are preferred. The acids (or bases or indicators as the case may be) are easily printed or otherwise provided on the sheet in the appropriate location.

*Example III*

A sheet was printed as shown in FIGURE 2 and the incomplete areas of the letters associated with each control was drawn by treating the sheet with a mixture of starch and potassium iodide. Writing in the treated areas with a strong non volatile acid such as phosphoric acid causes evolution of iodine which in turn causes production of the starch-iodine color. This particular system suffers in that the iodide is not very stable to light and it is quite difficult to print sufficiently invisibly. Special papers, such as mottled papers, however, may be used to render the starch coating less visible. Similarly, the well known oxidation-reduction color reactions of ferric ion with potassium ferrocyanide and ferrous ion with potassium ferricyanide were employed by treating the work sheet with either the oxidizing or reducing agent and writing with a solution of the other. The student was thus "rewarded" with a visual effect or "reprimanded" by a different visual effect depending upon the preciseness of his reproduction of the original. The potassium ferricyanide is quite toxic and this particular system is not preferred for that reason. Furthermore, although the colors are vivid, there may be a noticeable amount of "bleeding" or "carry-over" of colors. As with the other system according to the invention, the same color reaction system can be utilized in each of the teaching techniques described.

*Example IV*

A sheet of paper is printed as shown in FIGURE 3 with a picture of a house and the word "house" partially spelled beside the picture. The balance of the word was "spelled" with a coating of fine particles of attapulgite, which is a white clay which may be coated on the paper as follows: twenty weight percent of paper coating starch in water is cooked at 200° F. for fifteen minutes and, after cooling, a dispersion of one part of attapulgite in three parts of water is added to the starch in the ratio of one part dispersion to four parts of cooked starch and the material coated on the paper in the unfinished pattern of the word "house." This portion of the word is indiscernible from the untreated paper. The student is provided with a writing instrument containing 3% crystal violet lactone and 3% of the red dye Sudan III in 94% of chlorinated diphenyl having 48% chlorine, all as disclosed in Green, United States Patent No. 2,714,074, issued July 26, 1955. The writing instrument is conveniently a felt-tipped pen. The fluid writes red on contact with the paper and purple on contact with the attapulgite. The student, in attempting to write the word definition of the object depicted is thus either "rewarded" or "reprimanded" depending on the accuracy of his writing activity. The other color-reactant materials described in the aforementioned Patent No. 2,714,074 are also suitable. Thus, for example, halloysite, magnesium trisilicate, and sodium aluminum silicate (zeolite) may be used with malachite green lactone etc. and bentonite and halloysite can be used with o-hydroxybenzalactophenone.

*Example V*

Similarly to Example IV, paper can be treated with colloidal silica as an aqueous soil which dries to an invisible coating and which causes a color reaction when contacted with colorless solutions of leuco materials as disclosed in Ahlm et al. United States Patent No. 3,001,587, issued Sept. 26, 1961. The leuco materials are generally aromatic amines which are provided as colorless solutions in nonpolar solvents such as benzene. With paper treated as in FIGURE 4 with the silica, a student attempting to form letters with a wick-type pen which "writes" with the colorless leuco amine receives an instantaneous report of both correct (colored) and incorrect (no color) activity.

*Example VI*

A 1% by weight solution of lead acetate in ethylene glycol was coated on portions of book leaf and filter papers on a letterpress printing machine. On contacting the printed areas with a yellow solution of xylenol orange, an instantaneous blue-purple color resulted. Accordingly, this color reaction system is useful in the various teaching embodiments of the present invention. Instead of ethylene glycol, other solvents such as ethyl alcohol, propylene glycol, carbon tetrachloride and other organic solvents may be used. Other lead salts as well as salts of zinc and bismuth may be used. The color reaction system is generally known as a Metal Indicator system and other such systems can be used acording to the invention. For example, the following systems have been found suitable: Eriochrome Black T-Ca, Mg, Pb; Pan-Zn, Cu, Cd; Pyrocatechol Violet-Sn, Pb, Cu, Mg, Zn; Alizarin Red S-Zn, Pb, Sn, Th; Dithizone-Zn, Pb, Cd; Xylenol Orange-Zn, Bi, Th. Of the foregoing systems, the xylenol orange-lead and pyrocatechol violet-tin are preferred because the color reaction has a high degree of contrast. Both of these systems were found to operate in the presence of starches, gels and drying oils and the like which are usually found in printing media.

Example VII

A paper was partially printed with a printing ink having the following formulation:

| | Parts by weight |
|---|---|
| Propyl gallate | 1.75 |
| Uvinul 400 (proprietary name for 2,4-dihydroxy benzophenone) | 1.75 |
| Polyvinylpyrrolidone | 2.00 |
| Methanol | 95.50 |

The ingredients may be dissolved in the alcohol at room temperature. Other solvents, such as ethyl alcohol or higher boiling solvents such as isobutyl and isopropyl alcohol may be used. The polyvinylpyrrolidone serves as a vehicle and binder and was selected for its low toxicity. Other binders, of course, could be used. Uvinul 400 is a commercially available ultra-violet absorber. Other colorless absorbers, such as the various benzophenones can also be used. The propyl gallate used was Tenox PG, a proprietary name used by Eastman Chemical Products, Inc., Kingsport, Tenn., which is a powder of low toxicity used as an antioxidant in foodstuffs. The gallic acid derivative, like gallic acid itself, reacts instantaneously with iron salts to give a black colored reaction product. This reaction is utilized according to the invention by writing on the paper with an iron-containing ink which may have the following exemplary formulation:

| | Percent |
|---|---|
| Iron octoate as 6% solution in mineral spirits | 70 |
| Denatured alcohol ("Solox") | 30 |

When the printed paper is contacted with the iron-containing solution, a deep black color is produced. The alcohol acts as a solvent and any compatible solvent can be used as isopropanol or isobutanol or non-alcoholic solvents. The solvent, of course, should be compatible and able to dissolve both the propyl gallate and the polyvinylpyrrolidone to enable the color reaction to proceed sufficiently rapidly. The formulations can be used in teaching methods and devices in the same manner as described in connection with the other formulations described. The material printed on the paper can be rendered suitable for letterpress or other printing thereon by the use of various thickening agents and solvents.

A particularly useful method of printing the printing ink is a modified offset method which may be called dry offset. The image to be printed is provided on a Dycril plate in the usual manner. The prepared plate is then utilized on an offset duplicator in the usual manner except that the ink is applied by means of the water fountain.

Example VIII

Similarly to Example VII, paper was partially printed with the following printing "ink" formulation:

| | Parts by weight |
|---|---|
| 0.2% potassium hydroxide in denatured alcohol | 96.00 |
| Polyvinylpyrrolidone | 2.25 |
| Dimethylglyoxime | 1.75 |

The solution is made by heating with reflux. The writing fluid is composed of 0.5 part by weight of nickel chloride ($NiCl_2 \cdot 6H_2O$) in 99.5 parts by weight solvent such as isopropanol or a mixture of isopropanol and water and a trace of Pyla Cert Medium Green MX-65 dye. The color reaction is very fast and produces a permanent and brilliant pink color. The printing ink may be rendered suitable for letterpress printing by the use of thickeners and the like.

Example IX

The printing ink formulation of Example VII was used with a writing ink having the following formulation:

| | Parts by weight |
|---|---|
| Ferric chloride | 10.0 |
| Water | 58.0 |
| Propylene glycol | 30.0 |
| Triton X-100 (Rohm and Haas) | 1.5 |

This writing ink is advantageous in that it does not readily penetrate paper. Accordingly, where a page is printed on both sides with the printing ink, application of the writing ink will not cause any reaction between the writing ink and the ink printed on the other side of the paper.

Example X

Potassium succinate can be made into an invisible printing ink with a suitable film-forming and/or thickening agent such as polyvinyl alcohol. An intense green color is caused by contacting the printed areas with a writing ink containing copper chloride, copper nitrate or other copper salt.

The foregoing examples include several illustrations of chemical color-producing reactions of which virtually thousands are known as such. However, it is the application of such color reactions to teaching methods and devices which constitutes the present invention. The invention also contemplates the application of physical coloring or marking systems, such as the "wax" coating system of Example I, to teaching technology and other physical systems are also applicable. The examples, therefore, should not be construed as limiting and there are virtually hundreds of color reaction systems which would qualify for use in connection with the present teaching method and devices. A few of such systems, whose application to teaching technology will be apparent in view of the present disclosure, are fully disclosed in the following United States patents:

(1) Guthmann, No. 2,083,372—Cellosolve inks developable with water;
(2) Maier et al., No. 1,778,397—Lead sulphate developed with solution of soluble sulphide;
(3) Morse, No. 901,723—Yellow prussiate of potash developed with aqueous solution of iron chloride;
(4) Meyer, No. 866,293—Phenophthalein;
(5) Ostwald et al., No. 770,534—Hydrogen-peroxide developed with ammoniacal solution of a manganese salt;
(6) Tschofen, No. 583,958—Water developable colored matter masked with insoluble colored matter;
(7) Dalton, No. 3,009,890—Pressure clarifiable films;
(8) Adams, No. 2,474,084—Treatment of secondary amines with polor substances;
(9) Grupe, No. 3,014,301—Heat or pressure clarifiable film;
(10) Flower, No. 2,898,112—Pressure clarifiable film;
(11) Doberenz, No. 775,747—Masked colors developable with water;
(12) Brewster, No. 2,648,924—Pressure clarifiable film; and
(13) McKnight, No. 3,015,575—Pressure clarifiable film.

From the foregoing, it will become apparent that materials which undergo chemical color-producing reactions, and which are generally known as "sympathetic inks," are useful in the present teaching devices and methods. Similarly, pressure rupturable and pressure clarifiable coatings are also generally suitable. By using these color systems in the manner indicated, very efficient teaching methods and devices are obtained.

What is claimed is:
1. A device for teaching writing skills comprising a work surface, a visible control image associated with said surface, at least one second image which is at least partially invisible and which is logically related in geometrical configuration to said control image, the invisible portion of said second image being defined by a first area comprising a material which causes a first visual effect when contacted with a salt of iron, nickel or copper dispensed from a writing instrument, said work surface including a second area adjacent to and indiscernible from said first area and comprising a material which causes a second, different, visual effect when contacted with a salt of iron, nickel or copper dispensed from said writing instrument.

2. A device according to claim 1 wherein said first area comprises propyl gallate, and said salt is an iron salt.

3. A device according to claim 1 wherein said first area comprises potassium succinate and said salt is a copper salt.

4. A device according to claim 1 wherein said first area comprises dimethylglyoxine and said salt is a nickel salt.

5. A device according to claim 1 wherein the control image is located on said work surface.

6. A device according to claim 1 wherein the shape of said control image is substantially the same as the shape of said second image.

7. A device according to claim 1 wherein the size and shape of said control image are substantially the same as the size and shape of said second image.

8. A device according to claim 1 wherein one of said control and second images comprises a pictorial representation of a subject and the other of said control and second images comprises a verbal description of said subject.

9. A device according to claim 1 including a plurality of said work surfaces bound together in book form.

10. A method of teaching writing skills involving student use of a work surface comprising the steps of providing the student with a work surface which surface comprises at least one image which is at least partially invisible and which is logically related in geometrical configuration to an original, the invisible portion of said image being defined by a first area which comprises a material which causes a first visual effect when contacted with a salt of iron, nickel or copper dispensed from a writing instrument, said work surface including a second area adjacent to and indiscernible from said first area and comprising a material which causes a second, different, visual effect when contacted with a salt of iron, nickel or copper dispensed from said writing instrument, providing the student with a writing instrument, and instructing the student to contact said work surface with said writing instrument in a pattern logically related in geometrical configuration to said original whereby the correctness of that writing is indicated by production of said first and second visual effects.

11. A method according to claim 10 wherein said first area comprises propyl gallate and said salt is an iron salt.

12. A method according to claim 10 wherein said first area comprises potassium succinate and said salt dispensed from the writing instrument is a copper salt.

13. A method according to claim 10 wherein said first area comprises dimethylglyoxine and said salt is a nickel salt.

14. A method according to claim 10 wherein said original is located on said work surface.

15. A method according to claim 10 wherein said original image is presented to the student by spoken word.

References Cited

UNITED STATES PATENTS

| | | | |
|---|---|---|---|
| 2,068,497 | 1/1937 | Lorber | 35—37 |
| 2,618,866 | 11/1952 | Adams | 35—9 |

EUGENE R. CAPOZIO, *Primary Examiner.*

W. H. GRIEB, *Examiner.*